(12) United States Patent
Ngo et al.

(10) Patent No.: US 10,176,130 B2
(45) Date of Patent: Jan. 8, 2019

(54) SLAVE DEVICE IDENTIFICATION ON A SINGLE WIRE COMMUNICATIONS BUS

(71) Applicant: Qorvo US, Inc., Greensboro, NC (US)

(72) Inventors: Christopher Truong Ngo, Queen Creek, AZ (US); Alexander Wayne Hietala, Phoenix, AZ (US)

(73) Assignee: Qorvo US, Inc., Greensboro, NC (US)

( * ) Notice: Subject to any disclaimer, the term of this patent is extended or adjusted under 35 U.S.C. 154(b) by 38 days.

(21) Appl. No.: 15/472,756

(22) Filed: Mar. 29, 2017

(65) Prior Publication Data

US 2017/0286340 A1    Oct. 5, 2017

Related U.S. Application Data

(60) Provisional application No. 62/315,462, filed on Mar. 30, 2016.

(51) Int. Cl.
| | |
|---|---|
| *G06F 13/00* | (2006.01) |
| *G06F 13/364* | (2006.01) |
| *G06F 13/42* | (2006.01) |
| *G06F 13/40* | (2006.01) |

(52) U.S. Cl.
CPC .......... *G06F 13/364* (2013.01); *G06F 13/404* (2013.01); *G06F 13/4282* (2013.01)

(58) Field of Classification Search
CPC ........................... G06F 13/4282; G06F 13/364
See application file for complete search history.

(56) References Cited

U.S. PATENT DOCUMENTS

| | | | |
|---|---|---|---|
| 3,953,835 A | 4/1976 | Cuccio et al. | |
| 5,787,132 A | 7/1998 | Kishigami et al. | |
| 6,408,163 B1 | 6/2002 | Fik | |
| 7,685,320 B1 * | 3/2010 | Wishneusky | ............. G06F 1/26 323/222 |
| 9,430,321 B2 | 8/2016 | Slik | |
| 9,519,612 B2 | 12/2016 | Hietala et al. | |
| 2001/0050713 A1 | 12/2001 | Kubo et al. | |
| 2004/0100400 A1 | 5/2004 | Perelman et al. | |
| 2004/0128594 A1 | 7/2004 | Elmhurst et al. | |
| 2004/0221067 A1 | 11/2004 | Huang et al. | |
| 2005/0012492 A1 | 1/2005 | Mihalka | |
| 2006/0050694 A1 | 3/2006 | Bury et al. | |
| 2006/0152236 A1 | 7/2006 | Kim | |
| 2006/0236008 A1 | 10/2006 | Asano et al. | |
| 2009/0248932 A1 | 10/2009 | Taylor et al. | |
| 2011/0035632 A1 | 2/2011 | Hong et al. | |
| 2012/0030753 A1 | 2/2012 | Bas et al. | |

(Continued)

OTHER PUBLICATIONS

Non-Final Office Action for U.S. Appl. No. 14/575,491, dated May 26, 2017, 20 pages.

(Continued)

*Primary Examiner* — Zachary K Huson
(74) *Attorney, Agent, or Firm* — Withrow & Terranova, P.L.L.C.

(57) ABSTRACT

A system includes a single wire communications bus, a first slave device, and a second slave device. The first slave device and the second slave device each include a plurality of pins. The first slave device and the second slave device are uniquely identified on the single wire communications bus based on which one of the plurality of pins is coupled to the single wire communications bus.

20 Claims, 7 Drawing Sheets

(56) References Cited

U.S. PATENT DOCUMENTS

| | | |
|---|---|---|
| 2012/0226965 A1 | 9/2012 | Hammerschmidt et al. |
| 2013/0054850 A1 | 2/2013 | Co |
| 2013/0124763 A1 | 5/2013 | Kessler |
| 2013/0132624 A1 | 5/2013 | Chen et al. |
| 2013/0197920 A1 | 8/2013 | Lesso et al. |
| 2013/0265884 A1 | 10/2013 | Brombal et al. |
| 2014/0376278 A1 | 12/2014 | Fornage et al. |
| 2015/0074306 A1 | 3/2015 | Ayyagari et al. |
| 2015/0106541 A1 | 4/2015 | Southcombe et al. |
| 2015/0127862 A1 | 5/2015 | Fan et al. |
| 2015/0169482 A1 | 6/2015 | Ngo et al. |
| 2015/0192974 A1 | 7/2015 | Ngo et al. |
| 2015/0193297 A1 | 7/2015 | Ngo et al. |
| 2015/0193298 A1 | 7/2015 | Ngo et al. |
| 2015/0193321 A1 | 7/2015 | Ngo et al. |
| 2015/0193373 A1 | 7/2015 | Ngo et al. |
| 2016/0124892 A1* | 5/2016 | Amarilio ............. G06F 13/4282 710/110 |

OTHER PUBLICATIONS

Non-Final Office Action for U.S. Appl. No. 14/659,379, dated Apr. 7, 2017, 37 pages.
Author Unknown, "1-Wire," Wikipedia, last modified Jan. 16, 2015, accessed Feb. 12, 2015, http://en.wikipedia.org/wiki/1-Wire, 4 pages.
Author Unknown, "DS1822: Econo 1-Wire Digital Thermometer," Maxim Integrated, 2007, 21 pages.
Author Unknown, "MAXIM 1-Wire® Tutorial," MAXIM, online audiovisual presentation, 17 slides, No Date, accessed Feb. 12, 2015, http://www.maximintegrated.com/products/1-wire/flash/overview/ (38 images of slides).
Awtry, Dan, et al., "Design Guide v1.0," Springbok Digitronics, Aug. 19, 2004, 96 pages.
Final Office Action for U.S. Appl. No. 14/659,292, dated Apr. 30, 2018, 24 pages.
Final Office Action for U.S. Appl. No. 14/659,328, dated Mar. 20, 2018, 61 pages.
Final Office Action for U.S. Appl. No. 14/659,355, dated Apr. 17, 2018, 11 pages.
Final Office Action for U.S. Appl. No. 14/659,371, dated May 3, 2018, 21 pages.
Notice of Allowance for U.S. Appl. No. 14/659,379, dated Mar. 20, 2018, 10 pages.
Non-Final Office Action for U.S. Appl. No. 14/575,491, dated Nov. 30, 2017, 18 pages.
Advisory Action for U.S. Appl. No. 14/659,379, dated Feb. 26, 2018, 3 pages.
Non-Final Office Action for U.S. Appl. No. 14/659,292, dated Sep. 29, 2017, 27 pages.
Non-Final Office Action for U.S. Appl. No. 14/659,328, dated Sep. 8, 2017, 51 pages.
Non-Final Office Action for U.S. Appl. No. 14/659,355, dated Sep. 20, 2017, 32 pages.
Non-Final Office Action for U.S. Appl. No. 14/659,371, dated Sep. 25, 2017, 23 pages.
Final Office Action for U.S. Appl. No. 14/659,379, dated Oct. 18, 2017, 44 pages.
Advisory Action for U.S. Appl. No. 14/659,292, dated Aug. 10, 2018, 3 pages.
Notice of Allowance for U.S. Appl. No. 14/659,328, dated Jul. 2, 2018, 8 pages.
Advisory Action for U.S. Appl. No. 14/659,355, dated Jul. 5, 2018, 3 pages.
Advisory Action for U.S. Appl. No. 14/659,371, dated Aug. 1, 2018, 3 pages.
Non-Final Office Action for U.S. Appl. No. 15/467,790, dated Jun. 28, 2018, 14 pages.
Ex Parte Quayle Action for U.S. Appl. No. 15/365,315, mailed Jul. 26, 2018, 7 pages.
Notice of Allowance and Examiner-Initiated Interview Summary for U.S. Appl. No. 15/365,315, dated Sep. 14, 2018, 9 pages.
Non-Final Office Action for U.S. Appl. No. 14/659,355, dated Oct. 12, 2018, 7 pages.
Final Office Action for U.S. Appl. No. 15/467,790, dated Nov. 5, 2018, 15 pages.
Non-Final Office Action for U.S. Appl. No. 15/443,236, dated Nov. 16, 2018, 19 pages.

* cited by examiner

US 10,176,130 B2

SLAVE DEVICE IDENTIFICATION ON A SINGLE WIRE COMMUNICATIONS BUS

RELATED APPLICATIONS

This application claims the benefit of provisional patent application Ser. No. 62/315,462, filed Mar. 30, 2016, the disclosure of which is hereby incorporated herein by reference in its entirety.

FIELD OF THE DISCLOSURE

The present disclosure relates to single wire communications busses, and in particular to ways for uniquely identifying devices on a single wire communications bus.

BACKGROUND

Modern electronic devices may include a number of functional modules, each of which performs the same or a different function. Often, these modules need to communicate with one another. Communications busses are widely used for accomplishing this task. Various standard communications busses currently exist, including inter-integrated circuit ($I^2C$), RS-232, UNI/O, and the like. Recently, single wire communications busses have become popularized due to the convenience afforded by reducing routing requirements and possible interference between communication lines.

FIG. 1 illustrates a conventional single wire communications system 10. The conventional single wire communications system 10 includes a first single wire communications bus 12A and a second single wire communications bus 12B. A master controller 14 is coupled to each one of the first single wire communications bus 12A and the second single wire communications bus 12B. A number of slave devices 16 are each coupled to one of the first single wire communications bus 12A and the second single wire communications bus 12B.

The master controller 14 includes communications circuitry 18, a first-in-first-out (FIFO) buffer 20, a digitally controlled oscillator 22, power management circuitry 24, and secondary communications circuitry 26. The communications circuitry 18 is configured to interface with the first single wire communications bus 12A and the second single wire communications bus 12B in order to facilitate communication with the slave devices 16. The FIFO buffer 20 is used to store and access data required for communication on the first single wire communications bus 12A and the second single wire communications bus 12B. The digitally controlled oscillator 22 is used to generate signals for communication on the first single wire communications bus 12A and the second single wire communications bus 12B. The power management circuitry 24 is responsible for meeting the required power needs of the other circuitry in the master controller 14. The secondary communications circuitry 26 is configured to communicate with one or more other devices on a different type of communication bus, thereby enabling the slave devices 16 to communicate with devices that are not on the first single wire communications bus 12A and the second single wire communications bus 12B.

Each one of the slave devices 16 includes power management circuitry 28, communications circuitry 30, functional circuitry 32, a first pin 34A, and a second pin 34B. The power management circuitry 28 is responsible for meeting the required power needs of the other circuitry in the slave device 16. The communications circuitry 30 is configured to facilitate communications on the single wire communications bus 12. The functional circuitry 32 is configured to perform some function, which may be regulated or otherwise controlled by communication over the single wire communications bus 12. The first pin 34A is used to connect the slave device 16 to the single wire communications bus 12. The second pin 34B is used to connect the slave device 16 to ground via a power management capacitor $C_{PM}$.

Each one of the slave devices 16 must be uniquely identified on the single wire communications bus 12 to which they are attached. Conventionally, this has been done by a hard-coded unique slave identifier (USID) which is set for the slave device during manufacturing. So long as each one of the slave devices has a different USID, the master controller 14 can uniquely address each one of the slave devices and thus properly communicate therewith. The USID may be limited in size (e.g., 4 bits), thereby setting an upper limit to the number of slave devices 16 that can be present on a single wire communications bus while remaining uniquely identifiable (e.g., $2^4$ or 16 total devices or 1 master device and 15 slave devices for a 4 bit USID). Accordingly, multiple single wire communications busses may be provided as in the first single wire communications bus 12A and the second single wire communications bus 12B to accommodate a desired number of slave devices 16.

Slave devices 16 that are otherwise identical (e.g., by providing the same functional circuitry 32) must be provided as different physical parts to achieve the different USIDs. Accordingly, if eight slave devices 16 are needed in a system, eight different slave device 16 parts are needed. These eight different slave device 16 parts must be separately manufactured, inventoried, and installed, which is undesirable from both a supplier and a customer standpoint.

FIG. 2 is a waveform illustrating an exemplary communication sequence on the first single wire communications bus 12A and the second single wire communications bus 12B. The waveform begins with a start of sequence, followed by a command frame including a USID, a command, an address, and a command frame check sequence, followed by a data frame including data and a data frame check sequence, followed by a bus park, followed by an acknowledgement, followed by a fast charge. The start of sequence indicates the beginning of a message on the single wire communications bus. The command frame indicates the function of the message, where the USID indicates the slave device 16 for which the message is intended, the command indicates what the slave device 16 should do in response to the message (i.e., read data from memory, write data to memory), the address indicates a register address that is acted upon in a slave device 16 by the message, and the command frame check sequence is used to verify the contents of the command frame. The data frame provides the actual data for the message, which is acted on according to the command provided in the command frame, while the data frame check sequence is used to verify the contents of the command frame. The remaining portions of the waveform signify the end of the message.

Messages from the master controller 14 are broadcast over one or more of the single wire communications busses 12 as shown and received by all of the slave devices 16 connected thereto. However, only the slave device 16 associated with a USID that matches the one in the message responds thereto. The USID is only four bits long. This means that only fifteen different slave devices 16 may be included on a single wire communications bus 12 if they are uniquely identified by USID alone. To increase the number of slave devices 16 that may be included on a single wire communications bus 12, different part numbers may be used along with the USID to uniquely identify different slave devices 16. Further, a number of registers in memory of each one of the slave devices 16 may be reserved for further identification of slave devices 16 on the first single wire communications bus 12A and the second single wire communications bus 12B as discussed in co-pending U.S. patent application Ser. No. 15/467,790, the contents of which are hereby incorporated by reference in their entirety.

To illustrate, FIG. 3 is a chart showing register maps for the slave devices 16. A first subset of registers 36 in each one of the slave devices 16 is reserved for device identification, while a second subset of registers 38 are shared registers. Each one of the slave devices 16 is associated with a different one (or, while not shown, multiple ones) of the first subset of registers 36, which is illustrated by the shaded one of the first subset of registers 36. This means that the slave device 16 will only respond to messages on the single wire communications bus 12 that access (e.g., read from or write to) this register address by including it in the address field of the command frame. Since each one of the slave devices 16 is associated with only one of the first subset of registers 36, this provides an additional way to uniquely identify and thus communicate with the slave device 16 without changing a USID thereof. That is, all of the slave devices 16 may have the same USID but respond to a different one of the first set of registers 36. The number of registers in the first subset of registers 36 determines the total number of uniquely addressable slave devices 16 on a single wire communications bus 12 (multiplied by the number of different USIDs). The second subset of registers 38 may be shared across the slave devices 16 meaning that the contents of these registers may be synchronized across the slave devices 16. These shared registers may include calibration data, trigger data, product IDs, user IDs, and the like.

FIG. 4 is a chart showing alternative register maps for the slave devices 16. The register maps are similar those shown above in FIG. 3, except that each slave device 16 is associated with two different ones (or, while not shown, multiple ones) of the first subset of registers 36 as indicated by the shading provided therein. In this case, each one of the slave devices 16 may respond to two USIDs, and may use the first one of the first subset of registers 36 when addressed using the first USID and the second one of the first subset of registers 36 when addressed using the second USID. That is, if a slave device 16 is addressed using a first USID it may respond only to those messages that access the first register address, while if the slave device 16 is addressed using the second USID it may respond only to those messages that access the second register address. Using the register maps in FIG. 4 effectively doubles the number of times the same slave device 16 part can be used on the single wire communications bus 12. In the single wire communications system 10, the same slave device 16 part may be used for two of the slave devices 16 by simply addressing the slave devices 16 connected to the first single wire communications bus 12A using a first USID and addressing the slave devices 16 connected to the second single wire communications bus 12B using a second USID.

In essence, FIGS. 3 and 4 illustrate using a number of registers in a slave device 16 as a sub-address to the USID, thereby expanding the length of the unique identifier for each slave device. By using registers in each one of the slave devices 16 to uniquely identify the slave devices 16 on the single wire communications bus 12, the number of slave devices 16 that may be included on the single wire communications bus 12 may drastically increase. The cost in usable register space in each one of the slave devices 16 is generally negligible.

Similar to the USID, determining which one of the registers in the first subset of registers 36 a slave device 16 is associated with is hard-coded during manufacturing. As discussed above, this results in a large number of different products that perform the same task, leading to manufacturing and inventory issues. Accordingly, there is a need for slave devices and single wire communications systems that offer reconfigurable unique addressing without requiring separate manufacturing and/or product lines.

SUMMARY

In one embodiment, a system includes a single wire communications bus, a first slave device, and a second slave device. The first slave device and the second slave device each include a plurality of pins. The first slave device and the second slave device are uniquely identified on the single wire communications bus based on which one of the plurality of pins is coupled to the single wire communications bus. By uniquely identifying the first slave device and the second slave device in this manner, the number of slave device parts needed in the system may be significantly reduced, thereby saving cost on manufacturing, inventory, and installation of the slave devices.

In one embodiment, the single wire communications bus is connected to different ones of the plurality of pins on the first slave device and the second slave device.

In one embodiment, the first slave device and the second slave device have the same unique slave identifier (USID). The first slave device and the second slave device thus may be uniquely identified based on an associated register address that is accessed by commands on the single wire communications bus. The associated register address for the first slave device and the second slave device may be based on which one of the plurality of pins is coupled to the single wire communications bus.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
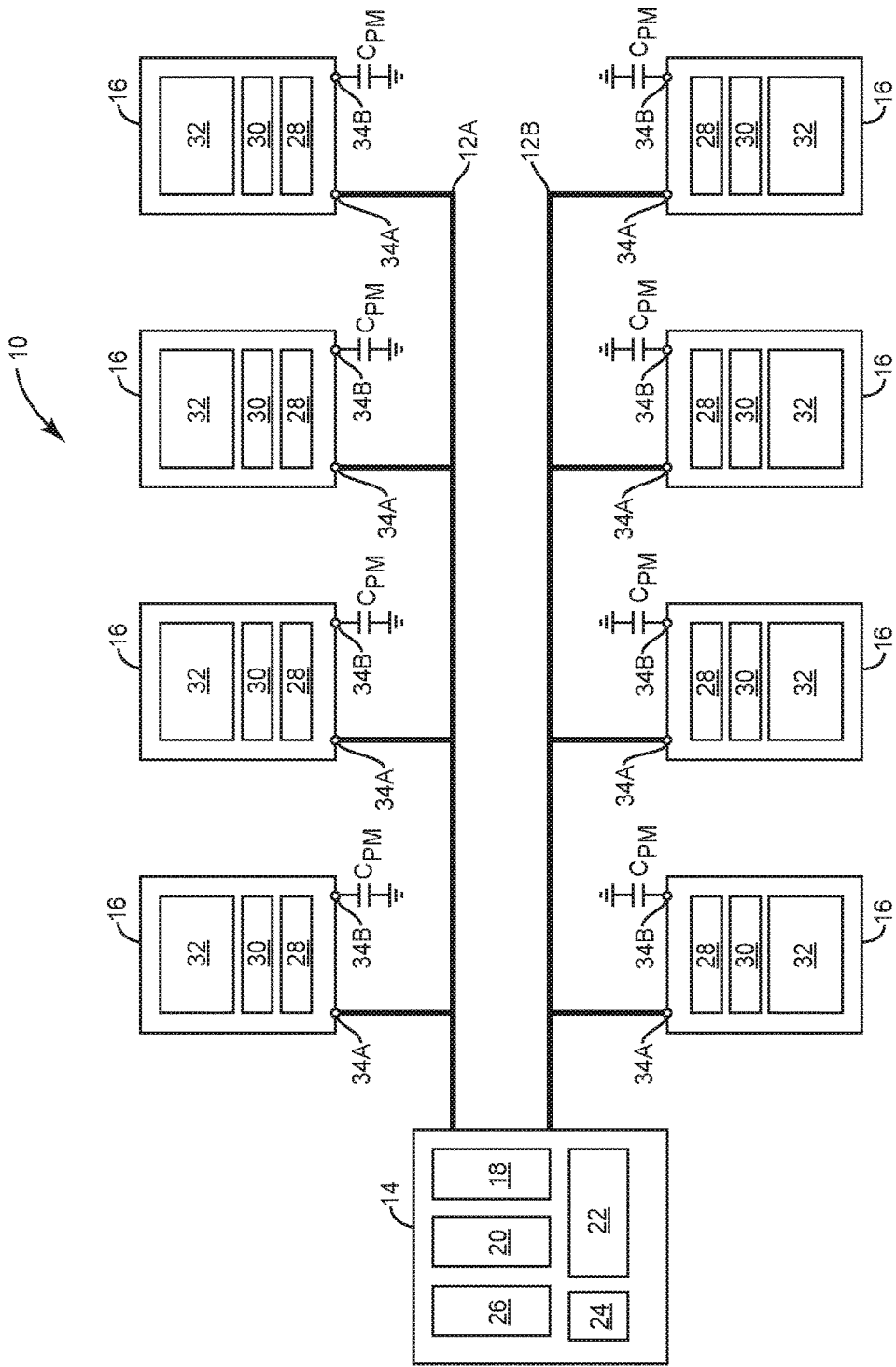
FIG. 1 is a functional schematic illustrating a conventional single wire communications system.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 5:
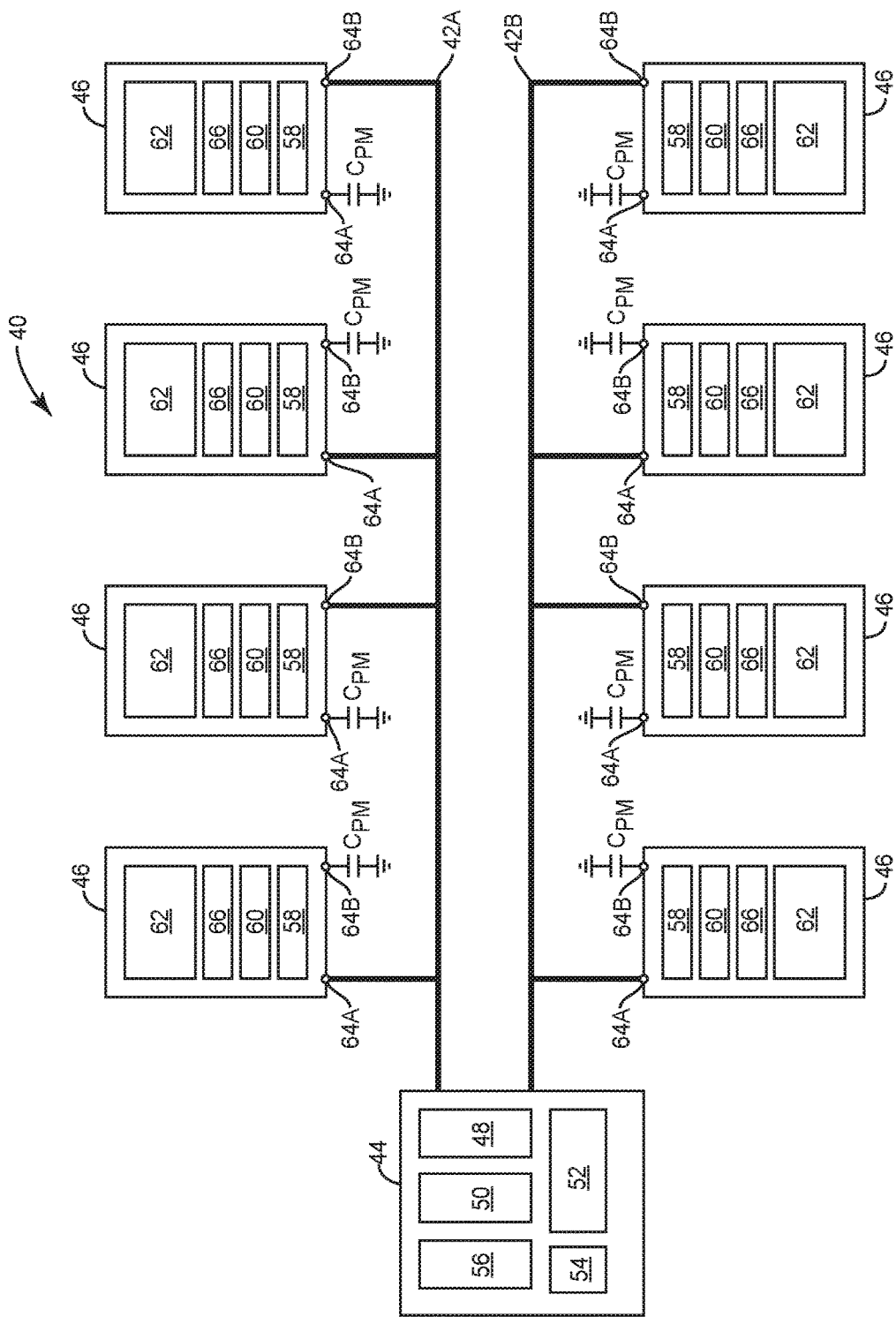
FIG. 5 is a functional schematic illustrating a single wire communications system according to one embodiment of the present disclosure.

FIG. 5 illustrates a single wire communications system 40 according to one embodiment of the present disclosure. The single wire communications system 40 includes a first single wire communications bus 42A and a second single wire communications bus 42B. A master controller 44 is coupled to each one of the first single wire communications bus 42A and the second single wire communications bus 42B. A number of slave devices 46 are each coupled to one of the first single wire communications bus 42A and the second single wire communications bus 42B.

The master controller 44 includes communications circuitry 48, a first-in-first-out (FIFO) buffer 50, a digitally controlled oscillator 52, power management circuitry 54, and secondary communications circuitry 56. The communications circuitry 48 is configured to interface with the first single wire communications bus 42A and the second single wire communications bus 42B in order to facilitate communication with the slave devices 46. The FIFO buffer 50 is used to store and access data required for communication on the first single wire communications bus 42A and the second single wire communications bus 42B. The digitally controlled oscillator 52 is used to generate signals for communication on the first single wire communications bus 42A and the second single wire communications bus 42B. The power management circuitry 54 is responsible for meeting the required power needs of the other circuitry in the master controller 44. The secondary communications circuitry 56 is configured to communicate with one or more other devices on a different type of communication bus, thereby enabling the slave devices 46 to communicate with devices that are not on the first single wire communications bus 42A and the second single wire communications bus 42B. For example, the secondary communications circuitry 56 may be radio frequency front end (RFFE) communications bus circuitry that allows the master controller 44 and thus the slave devices 46 to communicate with one or more other devices on an RFFE communications bus.

Each one of the slave devices 46 includes power management circuitry 58, communications circuitry 60, functional circuitry 62, a first pin 64A, a second pin 64B, and identification resolution circuitry 66. The power management circuitry 58 is responsible for meeting the required power needs of the other circuitry in the slave device 46. The communications circuitry 60 is configured to facilitate communications on the single wire communications bus 42. The functional circuitry 62 is configured to perform some function, which may be regulated or otherwise controlled by communication over the single wire communications bus 42. In one exemplary embodiment, the functional circuitry 62 includes a radio frequency (RF) switch that may be opened and/or closed in response to commands on the single wire communications bus 42. The first pin 64A is used to connect to one of the single wire communications bus 42 and ground via a power management capacitor $C_{PM}$. The second pin 64B is used to connect to the other one of the single wire communications bus 42 and ground via the power management capacitor $C_{PM}$. That is, the single wire communications bus 42 may connect to one of the first pin 64A and the second pin 64B. The identification resolution circuitry 66 is configured to uniquely identify the slave device 46 on the single wire communications bus 42 based on which one of the first pin 64A and the second pin 64B is connected to the single wire communications bus 42.

The identification resolution circuitry 66 may change a USID of the slave device 46, may change a product ID of the slave device 46, may change a register address associated with the slave device 46, or may change any other unique identifier of the slave device 46 based on which one of the first pin 64A and the second pin 64B is connected to the single wire communications bus 42. If the first pin 64A is connected to the single wire communications bus 42, the slave device 46 may be associated with a first USID, while if the second pin 64B is connected to the single wire communications bus 42 the slave device 46 may be associated with a second USID. Similarly, if the first pin 64A is connected to the single wire communications bus 42 the slave device 46 may be associated with a first register address while if the second pin 64B is coupled to the single wire communications bus 42 the slave device 46 may be associated with a second register address. In short, any number of different ways of identifying the slave device 46 may be changed based on the pin 64 coupled to the single wire communications bus 42.

Using the identification resolution circuitry 66 and changing the pin 64 connected to the single wire communications bus 42 may reduce the number of required slave device 46 parts, thus reducing the number of product lines required to be manufactured, inventoried, and installed. Table 1 illustrates how eight slave devices 46 illustrated in FIG. 5 can be uniquely identified using only two slave device 46 parts:

| Associated address | USID used | Part No. | First pin | Second pin |
|---|---|---|---|---|
| 0x00 | 0001 | QM18x00 | Comm. Bus | $C_{PM}$ |
| 0x01 | 0001 | QM18x00 | $C_{PM}$ | Comm. Bus |
| 0x02 | 0001 | QM18x01 | Comm. Bus | $C_{PM}$ |
| 0x03 | 0001 | QM18x01 | $C_{PM}$ | Comm. Bus |
| 0x04 | 0010 | QM18x00 | Comm. Bus | $C_{PM}$ |
| 0x05 | 0010 | QM18x00 | $C_{PM}$ | Comm. Bus |
| 0x06 | 0010 | QM18x01 | Comm. Bus | $C_{PM}$ |
| 0x07 | 0010 | QM18x01 | $C_{PM}$ | Comm. Bus |

Figure 4:
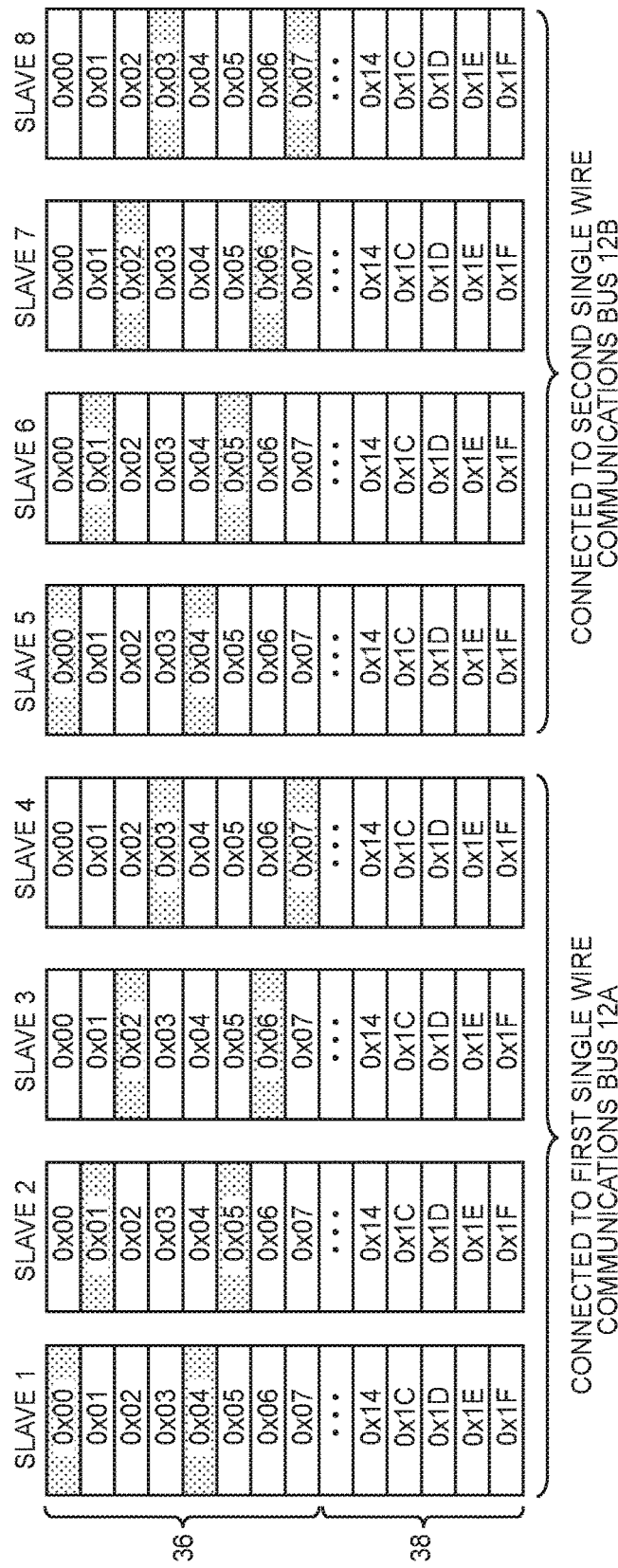
FIG. 4 is a register map illustrating a register map for a single wire communications system.

The slave devices 46 may include register maps similar to those discussed above with respect to FIG. 4. Accordingly, the slave devices 46 may respond to two USIDs and change their associated register address based on which USID is used to address them. In addition, the slave devices 46 may change their associated register address based on which one of the first pin 64A and the second pin 64B is coupled to the single wire communications bus 42 to achieve the different associated register addresses shown in the table. Accordingly, all of the slave devices 46 are made the exact same except for the different part numbers thereof, which are hard-coded. This means that eight slave devices 46 may be uniquely addressed using only two slave device 46 parts.

Figure 6:
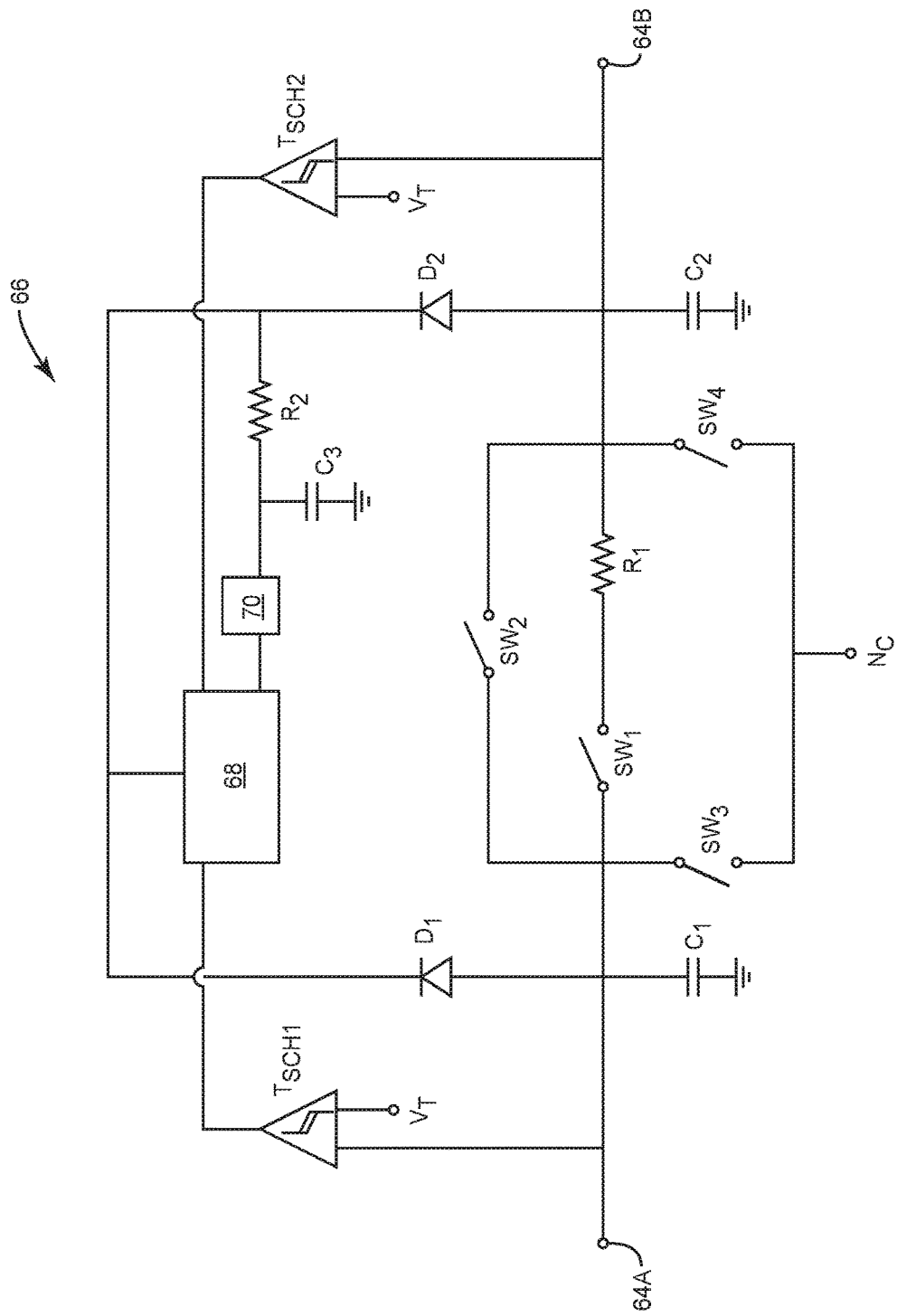
FIG. 6 is a functional schematic of identification resolution circuitry for a single wire communications system according to one embodiment of the present disclosure.

FIG. 6 shows details of the identification resolution circuitry 66 according to one embodiment of the present disclosure. For context, the first pin 64A and the second pin 64B are shown. The identification resolution circuitry 66 includes a first Schmitt trigger $T_{SCH1}$ coupled between the first pin 64A and a digital controller 68 and a second Schmitt trigger $T_{SCH2}$ coupled between the second pin 64B and the digital controller 68. A first diode $D_1$ is coupled between the first pin 64A and the digital controller 68. A first switch $SW_1$ is coupled in series with a first resistor $R_1$ between the first pin 64A and the second pin 64B. A second switch $SW_2$ is coupled in parallel with the first switch $SW_1$ and the first resistor $R_1$. A third switch $SW_3$ is coupled between the first pin 64A and a control node $N_C$. A fourth switch $SW_4$ is coupled between the second pin 64B and the control node $N_C$. A first capacitor $C_1$ is coupled between the first pin 64A and ground. A second capacitor $C_2$ is coupled between the second pin 64B and ground. A second diode $D_2$ is coupled in series with a second resistor $R_2$ and a power-on-reset (POR) circuit 70 between the second pin 64B and the digital controller 68. A third capacitor $C_3$ is coupled to ground between the POR circuit 70 and the second resistor $R_2$.

In operation, the single wire communications bus 42 is connected to one of the first pin 64A and the second pin 64B, while the supply capacitor $C_S$ is coupled to the other one of the first pin 64A and the second pin 64B. Initially, each one of the first switch $SW_1$, the second switch $SW_2$, the third switch $SW_3$, and the fourth switch $SW_4$ are open. When the single wire communications bus 42 is turned on, power is applied to the pin 64 connected thereto and delivered via the second resistor $R_2$ and the third capacitor $C_3$ to the POR circuit 70, which powers on the digital controller 68 after a delay set by the resistance of the second resistor $R_2$ and the third capacitor $C_3$. This is to ensure that the digital controller 68 is not powered on before adequate power is available from the single wire communications bus 42.

Figure 2:
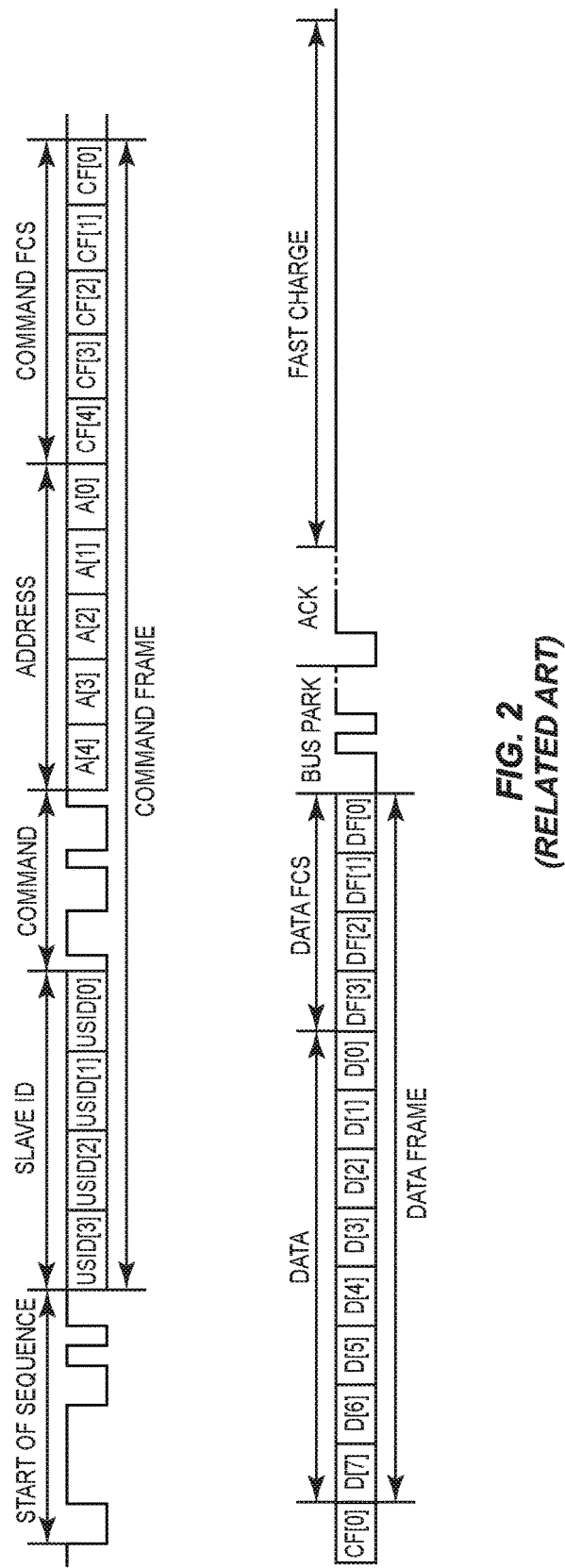
FIG. 2 is a diagram illustrating a message for a single wire communications system.
Figure 3:
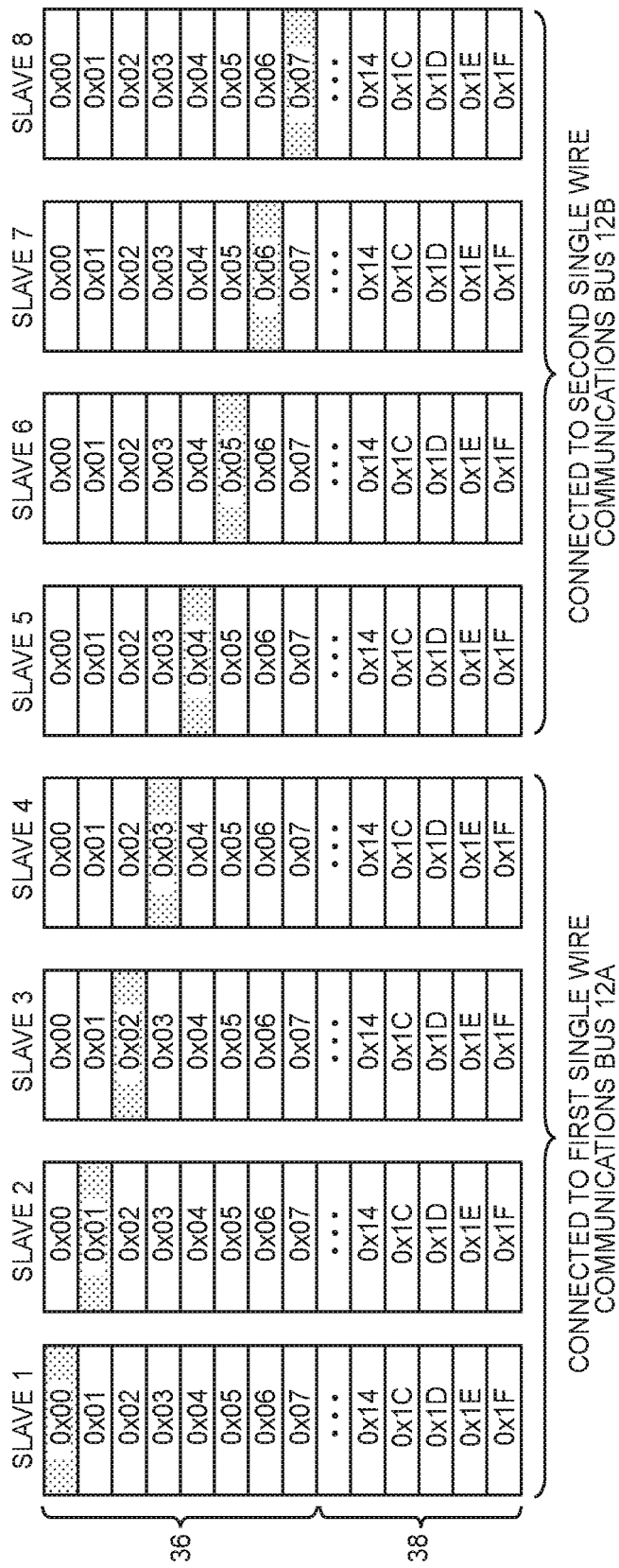
FIG. 3 is a diagram illustrating a register map for a single wire communications system.

Once the digital controller 68 is powered on, the first switch $SW_1$ is closed so that the supply capacitor $C_S$ is charged by the single wire communications bus 42. The typical charging time of the supply capacitor $S_C$ is ~100 μs (5×RC) where R=200 and C=0.1 μF. An initialization time from when the single wire communications bus 42 is turned on is thus assumed to be about 200 μs due to the specification thereof. When a message is sent on the single wire communications bus 42, the pin 64 connected thereto is pulled low. The digital controller 68 detects this within a few nanoseconds via one of the first Schmitt trigger $T_{SCH1}$ and the second Schmitt trigger $T_{SCH2}$. The digital controller 68 then knows which one of the first pin 64A and the second pin 64B is connected to the single wire communications bus 42. The first switch $SW_1$ is then opened to prevent the supply capacitor $C_S$ from discharging back through the first resistor $R_1$, and can close one of the third switch $SW_3$ and the fourth switch $SW_4$ to connect the single wire communications bus 42 to the control node $N_C$ which may be connected, for example, to the communications circuitry 48 and thus provide the message. The digital controller may close the second switch $SW_2$ along with one of the third switch $SW_3$ or the fourth switch $SW_4$, depending on which one of the first pin 64A and the second pin 64B is coupled to the single wire communications bus 42, during a fast charge portion of the message (see FIG. 2 above) in order to quickly charge the supply capacitor $C_S$ and one or more other components.

Notably, the identification resolution circuitry 66 shown in FIG. 6 is merely exemplary. Those skilled in the art will recognize that there are any number of ways to detect which pin the single wire communications bus 42 is connected to and act accordingly, all of which are contemplated herein.

Figure 7:
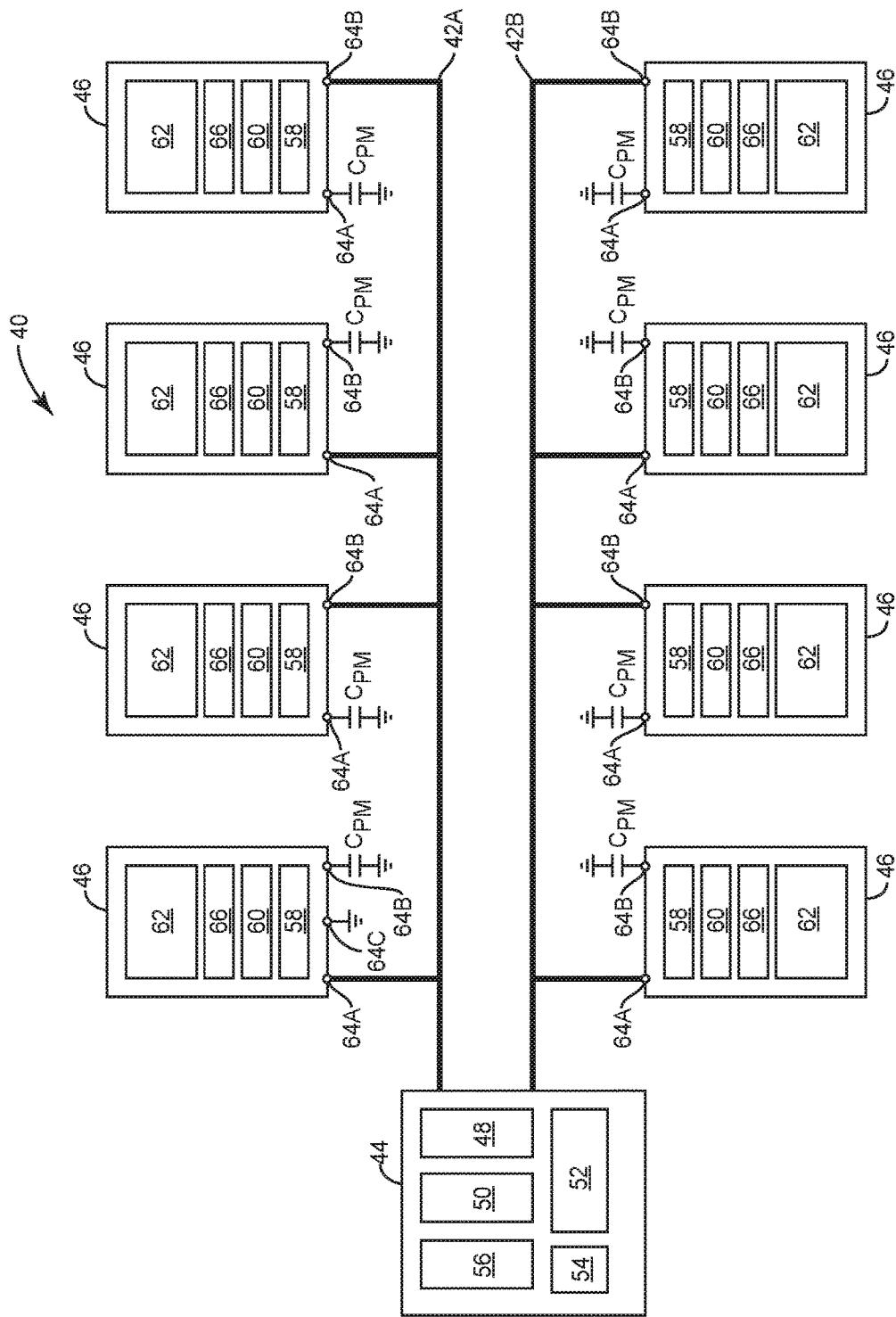
FIG. 7 is a functional schematic illustrating a single wire communications system according to one embodiment of the present disclosure.

The concepts discussed above may be extended by adding additional pins to the slave devices 46, as shown in FIG. 7. Here, the slave devices 46 include a third pin 64C, which may be coupled directly to ground or coupled to ground via the supply capacitor $C_S$. The two extra states afforded by the third pin 64C may further reduce the number of slave device 46 parts required for a given system, as indicated in Table 2:

| Associated address | USID used | Part No. | First pin | Second pin | Third pin |
|---|---|---|---|---|---|
| 0x00 | 0001 | QM18x00 | Comm. Bus | $C_{PM}$ | Ground |
| 0x01 | 0001 | QM18x00 | $C_{PM}$ | Comm. Bus | Ground |
| 0x02 | 0001 | QM18x00 | Comm. Bus | $C_{PM}$ | $C_{PM}$ |
| 0x03 | 0001 | QM18x00 | $C_{PM}$ | Comm. Bus | $C_{PM}$ |

As shown, four uniquely addressable slave devices 46 may be achieved by one slave device 46 part when connecting the pins 64 as shown. Table 3 extends this concept using multiple register addressing as discussed above with respect to FIG. 4:

| Associated address | USID used | Part No. | First pin | Second pin | Third pin |
|---|---|---|---|---|---|
| 0x00 | 0001 | QM18x00 | Comm. Bus | $C_{PM}$ | Ground |
| 0x01 | 0001 | QM18x00 | $C_{PM}$ | Comm. Bus | Ground |
| 0x02 | 0001 | QM18x00 | Comm. Bus | $C_{PM}$ | $C_{PM}$ |
| 0x03 | 0001 | QM18x00 | $C_{PM}$ | Comm. Bus | $C_{PM}$ |
| 0x04 | 0010 | QM18x00 | Comm. Bus | $C_{PM}$ | Ground |
| 0x05 | 0010 | QM18x00 | $C_{PM}$ | Comm. Bus | Ground |
| 0x06 | 0010 | QM18x00 | Comm. Bus | $C_{PM}$ | $C_{PM}$ |
| 0x07 | 0010 | QM18x00 | $C_{PM}$ | Comm. Bus | $C_{PM}$ |

As shown, eight uniquely addressable slave devices 46 may be achieved by one slave device 46 part when connecting the pins 64 as shown and allowing each slave device 46 to respond to different register addresses based on the USID used to address the slave device 46. Adding additional pins may further increase the number of uniquely addressable slave devices 46 from a single slave device 46 part.

Those skilled in the art will recognize improvements and modifications to the preferred embodiments of the present disclosure. All such improvements and modifications are considered within the scope of the concepts disclosed herein and the claims that follow.

What is claimed is:

1. A system comprising:
a single wire communications bus; and
a first slave device and a second slave device each comprising a plurality of pins, wherein the first slave device and the second slave device are uniquely identified on the single wire communications bus based on which one of the plurality of pins is coupled to the single wire communications bus.

2. The system of claim 1 wherein the single wire communications bus is coupled to different ones of the plurality of pins on the first slave device and the second slave device.

3. The system of claim 2 wherein the first slave device and the second slave device are associated with the same unique slave identifier.

4. The system of claim 3 wherein the first slave device and the second slave device are uniquely identified based on a register address acted on by a message provided on the single wire communications bus.

5. The system of claim 4 wherein a register address associated with the first slave device and a register address associated with the second slave device are based on which one of the plurality of pins is coupled to the single wire communications bus.

6. The system of claim 5 wherein the first slave device and the second slave device are configured to respond to a message on the single wire communications bus that acts on a register address associated with the slave device.

7. The system of claim 1 wherein the first slave device and the second slave device are uniquely identified based on which one of the plurality of pins is coupled to the single wire communications bus and an impedance coupled to a different one of the plurality of pins.

8. A slave device comprising:
a plurality of pins;
communications circuitry configured to communicate with one or more other devices via a single wire communications bus; and
identification resolution circuitry configured to uniquely identify the slave device on the single wire communications bus based on which one of the plurality of pins is connected to the single wire communications bus.

9. The slave device of claim 8 wherein the slave device has the same unique slave identifier as at least one other slave device coupled to the single wire communications bus.

10. The slave device of claim 9 wherein the slave device is uniquely identified based on a register address acted on by a message provided on the single wire communications bus.

11. The slave device of claim 10 wherein the register address associated with the slave device is based on which one of the plurality of pins is coupled to the single wire communications bus.

12. The slave device of claim 11 wherein the communications circuitry is further configured to respond to a message on the single wire communications bus that acts on the register address associated with the slave device.

13. The slave device of claim 8 wherein the identification resolution is configured to uniquely identify the slave device on the single wire communications bus based on which one of the plurality of pins is coupled to the single wire communications bus and an impedance coupled to a different one of the pins.

14. A method comprising:
coupling a plurality of slave devices to a single wire communications bus, each one of the plurality of slave devices comprising a plurality of pins; and
uniquely identifying the plurality of slave devices on the single wire communications bus based on which one of the plurality of pins is coupled to the single wire communications bus.

15. The method of claim 14 wherein the single wire communications bus is coupled to different ones of the plurality of pins on at least two of the plurality of slave devices.

16. The method of claim 15 wherein the at least two of the plurality of slave devices have the same unique slave identifier.

17. The method of claim 16 wherein the at least two of the plurality of slave devices are identified based on a register address acted on by a message provided on the single wire communications bus.

18. The method of claim 17 wherein a register address associated with the at least two of the plurality of slave devices is based on which one of the plurality of pins is coupled to the single wire communications bus.

19. The method of claim 18 wherein the plurality of slave devices are configured to respond to a message on the single wire communications bus that acts on a register address associated with the slave device.

20. The method of claim 14 wherein the plurality of slave devices are uniquely identified based on which one of the plurality of pins is coupled to the single wire communications bus and an impedance coupled to a different one of the plurality of pins.

* * * * *